(12) United States Patent
Omura

(10) Patent No.: US 9,832,981 B2
(45) Date of Patent: Dec. 5, 2017

(54) MOVABLE HOOD FOR REEL SEAT, REEL SEAT, AND FISHING ROD INCLUDING SAME

(71) Applicant: FUJI KOGYO CO., LTD., Shizuoka-shi (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 0 days.

(21) Appl. No.: 14/911,230

(22) PCT Filed: Sep. 2, 2014

(86) PCT No.: PCT/JP2014/073031
§ 371 (c)(1),
(2) Date: Feb. 9, 2016

(87) PCT Pub. No.: WO2015/037471
PCT Pub. Date: Mar. 19, 2015

(65) Prior Publication Data
US 2016/0192628 A1    Jul. 7, 2016

(30) Foreign Application Priority Data

Sep. 10, 2013  (KR) .................. 10-2013-0108610
May 30, 2014   (KR) .................. 10-2014-0065929

(51) Int. Cl.
*A01K 87/06* (2006.01)

(52) U.S. Cl.
CPC .................. *A01K 87/06* (2013.01)

(58) Field of Classification Search
CPC ......... A01K 87/06; A01K 87/00; A01K 87/02
See application file for complete search history.

(56) References Cited

U.S. PATENT DOCUMENTS 4,821,447 A * 4/1989 Nakayama ............. A01K 87/06
                                                                156/188
5,904,000 A   5/1999 Ohmura
(Continued)

FOREIGN PATENT DOCUMENTS

CN    101057570 A    10/2007
CN    101258844 A     9/2008
(Continued)

OTHER PUBLICATIONS

International Search Report dated Dec. 9, 2014, in PCT/JP2014/073031 filed Sep. 2, 2014.

*Primary Examiner* — Christopher P Ellis
*Assistant Examiner* — Jessica B Wong
(74) *Attorney, Agent, or Firm* — Oblon, McClelland, Maier & Neustadt, L.L.P.

(57) ABSTRACT

A movable hood for a reel seat has a hood portion, through which a body of a reel seat passes, and a nut portion, which is connected to the hood portion to rotate around the body and is threadedly coupled to an outer peripheral surface of the body at an inner peripheral surface. The hood portion has a pair of first guide projections and a second guide projection which are fitted to the outer peripheral surface of the body. The first guide projections project from an inner peripheral surface of the hood portion above a central axis of the hood portion, and the second guide projection projects from the inner peripheral surface of the hood portion at a lower end of the hood portion. A radial thickness in a cross section of the hood portion gradually decreases from the first guide projections toward the second guide projection.

7 Claims, 12 Drawing Sheets

(56) References Cited

U.S. PATENT DOCUMENTS 7,159,355 B2    1/2007  Ohmura et al.
D569,945 S  *   5/2008  Omura .................. D22/142

FOREIGN PATENT DOCUMENTS

| | | |
|---|---|---|
| GB | 2 194 871 A | 3/1988 |
| JP | 63-152927 A | 6/1988 |
| JP | 3053767 B2 | 6/2000 |
| JP | 2000-333564 A | 12/2000 |
| JP | 2004-337098 A | 12/2004 |
| JP | 2006-333723 A | 12/2006 |
| JP | 2009-232746 A | 10/2009 |
| JP | 2010-273586 A | 12/2010 |
| JP | D1409072 | 3/2011 |
| JP | 2012-110303 A | 6/2012 |

* cited by examiner

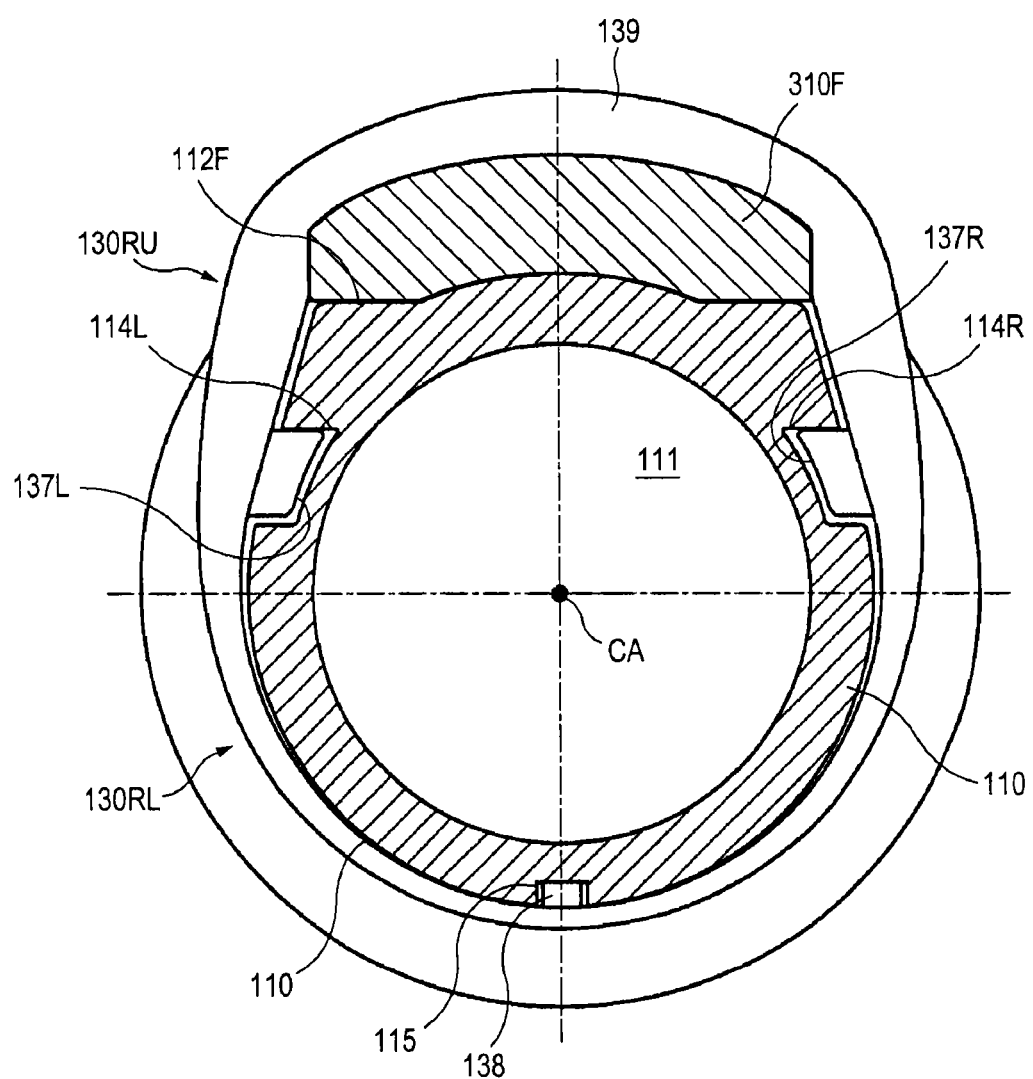

1

MOVABLE HOOD FOR REEL SEAT, REEL SEAT, AND FISHING ROD INCLUDING SAME

CROSS-REFERENCE TO RELATED APPLICATIONS

This application is a 35 U.S.C §371 national stage filing of International Application No. PCT/JP2014/073031, filed on Sep. 2, 2014, which claims the benefit of Korean Patent Application No. 2013-0108610, filed on Sep. 10, 2013 and Korean Patent Application No. 2014-0065929, filed on May 30, 2014, the entire contents of each of which are incorporated by reference herein.

TECHNICAL FIELD

The present disclosure relates to a reel seat attached to a fishing rod to mount a reel to the fishing rod, and a movable hood used with a reel seat to clamp an attachment leg of the reel. Further, the present disclosure relates to a fishing rod such a movable hood or a reel seat.

BACKGROUND

A reel for a fishing rod such as a spinning reel, a bait casting reel, etc. is mounted to a fishing rod by means of a reel seat. By way of example of a reel seat, there is a plate-shaped reel seat, which is attached on an outer surface of a fishing rod, and a cylinder-shaped reel seat, through which a fishing rod passes. The cylinder-shaped reel seat has, for example, a fixed hood and a movable hood for clamping attachment legs of a reel to a body of the reel seat. The movable hood has a shape of a ring that is movable along the body of the reel seat. The reel is mounted on the reel seat by clamping one of the attachment legs of the reel to the body of the reel seat through the fixed hood, and clamping the other of the attachment legs of the reel to the body of the reel seat through the movable hood.

When a user holds a fishing rod with a reel mounted thereto, the user grips the reel seat and the user's fingers make contact with a lower outer surface of the fixed or movable hood and a lower outer surface of the body. Since there is a stepped portion (an unevenness between the outer surface of the body of the reel seat and the outer surface of the movable hood) between the movable hood and the body, the user may feel irritated if the user touches a protrusion with the user's fingers, and thus cannot hold the fishing rod with a grip feeling of stability. A reel seat which reduces an irritative feeling and enhances a grip feeling is required in the art.

Patent Document 1: Japanese Patent Registration Publication No. 3053767

Patent Document 2: Japanese Design Registration Publication No. 1409072

SUMMARY

As shown in FIG. 1, Japanese Patent Registration Publication No. 3053767 discloses a reel seat 10 which reduces a stepped portion between a body and a movable hood of a reel seat. According to this patent document, to reduce the stepped portion between the movable hood 13 and the body 11, a cylindrical metallic member is put on the movable hood 13. However, to use a metallic member on the movable hood 13 makes the reel seat 10 become heavy and does not ensure various shape designs.

Further, as shown in FIGS. 2A and 2B, Japanese Design Registration Publication No. 1409072 discloses a movable hood of a reel seat, which is made of a resin material. If the movable hood is formed of a resin material, the thickness of the movable hood must be thick in order to ensure the strength of the movable hood. This rather increases the stepped portion between the body and the movable hood of the reel seat.

The embodiments disclosed in the present disclosure solve the aforementioned problems of the prior art. Some embodiments of the present disclosure provide a movable hood, which is made of a resin material that is lightweight and provides various shape designs, and which reduces a stepped portion between the movable hood and a body of a reel seat due to a thin thickness of a portion located opposite a portion for clamping an attachment leg of the reel.

Further, some embodiments of the present disclosure provide a movable hood wherein a portion, which is located opposite a portion for clamping an attachment leg of the reel, has a thin thickness and the strength of such a portion is enhanced.

Further, some embodiments of the present disclosure provide a reel seat which includes the aforementioned movable hood and thus has a superior grip feeling.

Further, some embodiments of the present disclosure provide a fishing rod including the aforementioned movable hood or the aforementioned reel seat.

One aspect of the present disclosure provides a movable hood which is used with a reel seat for mounting a reel to a fishing rod. In an exemplary embodiment, a movable hood for a reel seat includes: a hood portion through which a body of a reel seat passes, and which presses and clamps an attachment leg of a reel to the body; and a nut portion which is connected to the hood portion so as to rotate around the body and is threadedly coupled to an outer peripheral surface of the body at an inner peripheral surface. The hood portion includes a pair of first guide projections and a second guide projection which are fitted to the outer peripheral surface of the body to guide a movement in a longitudinal direction of the body. The pair of first guide projections project from an inner peripheral surface of the hood portion above a central axis of the hood portion, and the second guide projection projects from the inner peripheral surface of the hood portion at a lower end of the hood portion. In a cross section of a portion of the hood portion in a longitudinal direction, a radial thickness of the portion in the longitudinal direction gradually decreases from the first guide projections toward the second guide projection.

In an embodiment, in the cross section of the portion in the longitudinal direction, a vertical thickness of the first guide projections is greater than a horizontal thickness of the second guide projection, and the horizontal thickness of the second guide projection is greater than a vertical thickness of the hood portion at the lower end of the hood portion. Further, in the cross section of the portion in the longitudinal direction, the vertical thickness of the hood portion at the lower end of the hood portion is less than a horizontal thickness of the hood portion at lower ends of the first guide projections. Further, in one embodiment, in the cross section of the portion in the longitudinal direction, the vertical thickness of the hood portion at the lower end of the hood portion is 35% to 80% of the horizontal thickness of the hood portion at the lower ends of the first guide projections.

In an embodiment, in a longitudinal section of the hood portion, a vertical thickness of a lower half of the hood portion gradually decreases toward a rear end of the hood portion.

Another aspect of the present disclosure is related to a reel seat. In an exemplary embodiment, a reel seat includes a body, a fixed hood, and the movable hood according to the above-described embodiments. The body includes: a seat portion, on which a pair of attachment legs of a reel is seated, at an upper side; and a male thread in an outer peripheral surface of one end portion. The body includes a bore through which a portion of a fishing rod passes in a longitudinal direction. The movable hood is located at the one end portion and clamps one of the pair of attachment legs to the seat portion of the body. The nut portion of the movable hood is threadedly coupled to the male thread at an inner peripheral surface of the nut portion. The fixed hood is located at an opposite end portion of the body and clamps the other of the pair of the attachment legs to the seat portion of the body.

A further aspect of the present disclosure is related to a fishing rod. A fishing rod according to an embodiment includes the above-described movable hood for a reel seat or the above-described reel seat.

According to the movable hood of the reel seat according to an embodiment, the radial thickness of the lower half of the hood portion gradually decreases toward the lower end of the hood portion. Thus, the vertical thickness of the hood portion at the lower end is smallest and the hood portion distributes the upward force, which is applied to the hood portion due to the reaction force from the attachment leg of the reel, through the load application to the first guide projections and the second guide projection. Accordingly, the hood portion of the movable hood can enhance its strength while having a thin thickness of the lower half. Further, since the thickness-decreasing lower half of the hood portion comes into contact with the body of the reel seat while being bent, the hood portion distributes more of an upward force and further reduces the stepped portion between the hood portion and the body, thus achieving a reel seat having superior grip feeling and holding feeling. Further, due to the elasticity that is concomitant with the bending of the lower half of the hood portion, the hood portion can clamp the attachment leg of the reel to the body without rattling.

BRIEF DESCRIPTION OF THE DRAWINGS

FIG. 17 is a sectional view similar to FIG. 16, illustrating that the upward force applied to the hood portion of the movable hood is distributed and a stepped portion is reduced between a lower end of the movable hood and a lower end of the body.

DETAILED DESCRIPTION

Figure 1:
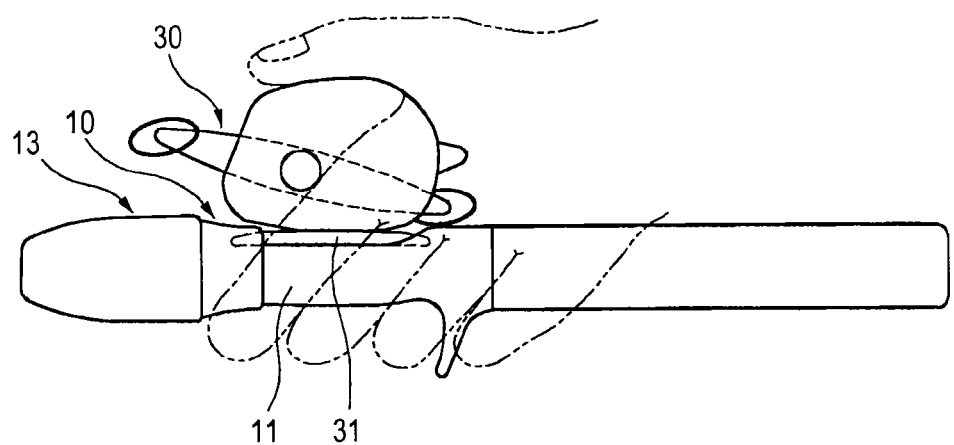
FIG. 1 is a side view showing a reel seat of a prior art.
Figure 2A:
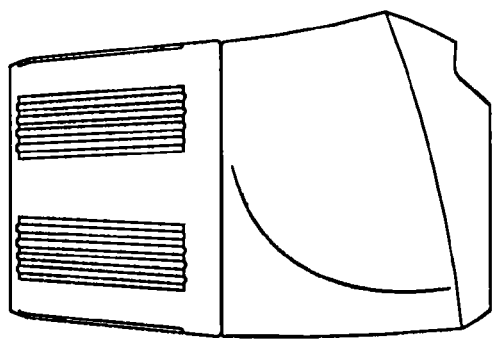
FIG. 2A is a side view showing a movable hood of a prior art.
Figure 2B:
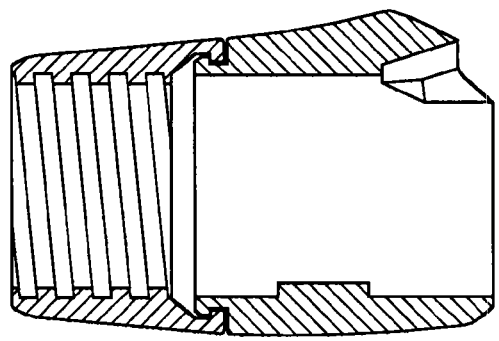
FIG. 2B is a longitudinal sectional view of the movable hood shown in FIG. 2A.

Descriptions are made as to embodiments of a movable hood for a reel seat and embodiments of a reel seat including the same according to the present disclosure with reference to FIGS. 3 to 17. In FIGS. 3 to 17, like reference numerals denote like or corresponding elements or parts.

The directional term "frontward," "front" or the like as used herein means a direction directed toward a tip of a fishing rod (e.g. a direction indicated by an arrow T in FIG. 3) when a reel seat according to an embodiment is attached to the fishing rod in a so-called down lock type, while the directional term "rearward," "rear" or the like means a direction directed toward a butt of the fishing rod (e.g. a direction indicated by an arrow B in FIG. 3) when a reel seat according to an embodiment is attached to the fishing rod in a so-called down lock type. Further, as used herein, the directional term "upward," "upper" or the like is based on a direction in which a reel is mounted on a reel seat, while the directional term "downward," "lower" or the like means a direction opposite to the upward or upper direction.

Figure 3:
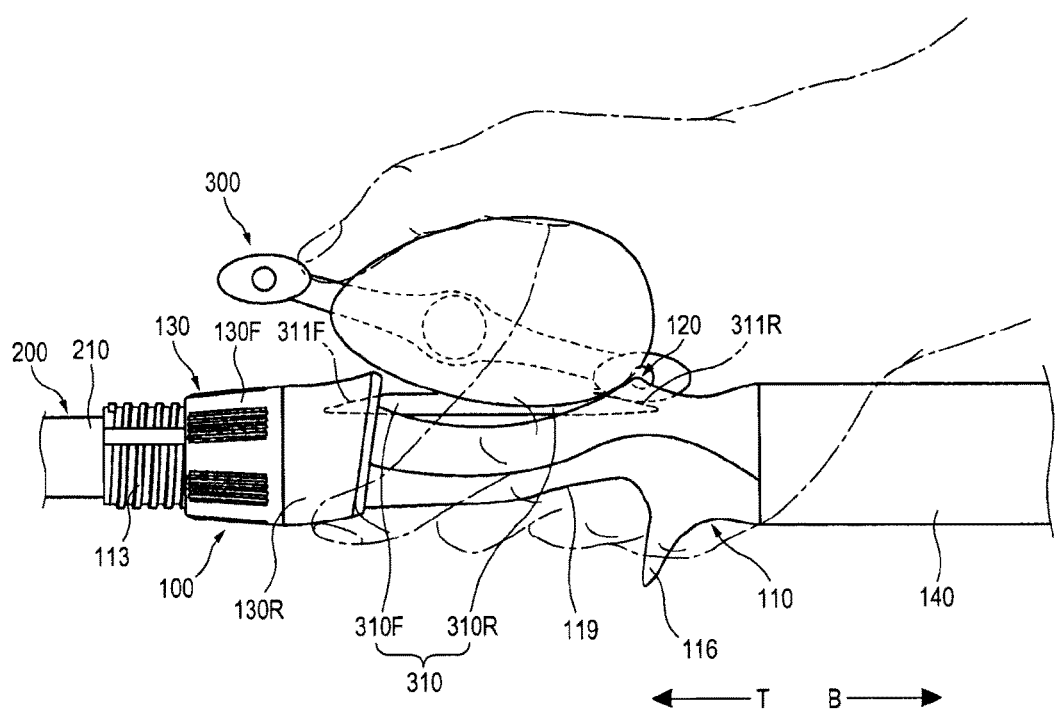
FIG. 3 is a side view showing that a reel seat according to an embodiment of the present disclosure is attached to a fishing rod and a reel is mounted on the reel seat.

A reel seat 100 according to an embodiment shown in FIG. 3 is used for mounting a bait casting reel (hereinafter, briefly referred to as a "reel") 300 on a fishing rod 200. A reel which can be mounted on the reel seat 100 is not limited to the reel 300 shown in FIG. 3 and may include other types of reels such as a spinning reel.

The reel 300 includes a spool around which a fishing line is wound, a handle for rotating the spool, etc. The reel 300 has a pair of attachment legs 310 for attachment to the reel seat 100. The attachment legs 310 extend approximately straight. In an embodiment, the attachment legs 310 include a front attachment leg 310F and a rear attachment leg 310R. The front attachment leg 310F has a front end portion, the cross-sectional area of which gradually decreases toward a front end of the front attachment leg 310F, and the rear attachment leg 310R has a rear end portion, the cross-sectional area of which gradually decreases toward a rear end of the rear attachment leg 310R. That is, the front attachment leg 310F is shaped such that its height gradually decreases toward its front end, and the rear attachment leg 310R is shaped such that its height gradually decreases toward its rear end. Thus, the front attachment leg 310F has, at a front upper end portion, an inclined surface 311F which is inclined toward the front end, and the rear attachment leg 310R has, at a rear upper end portion, an inclined surface 311R which is inclined toward the rear end. The front end portion of the front attachment leg 310F is inserted to a front insertion cavity of the reel seat, which will be described below. The rear end portion of the rear attachment leg 310R is inserted to a rear insertion cavity of the reel seat, which will be described below.

Figure 4:
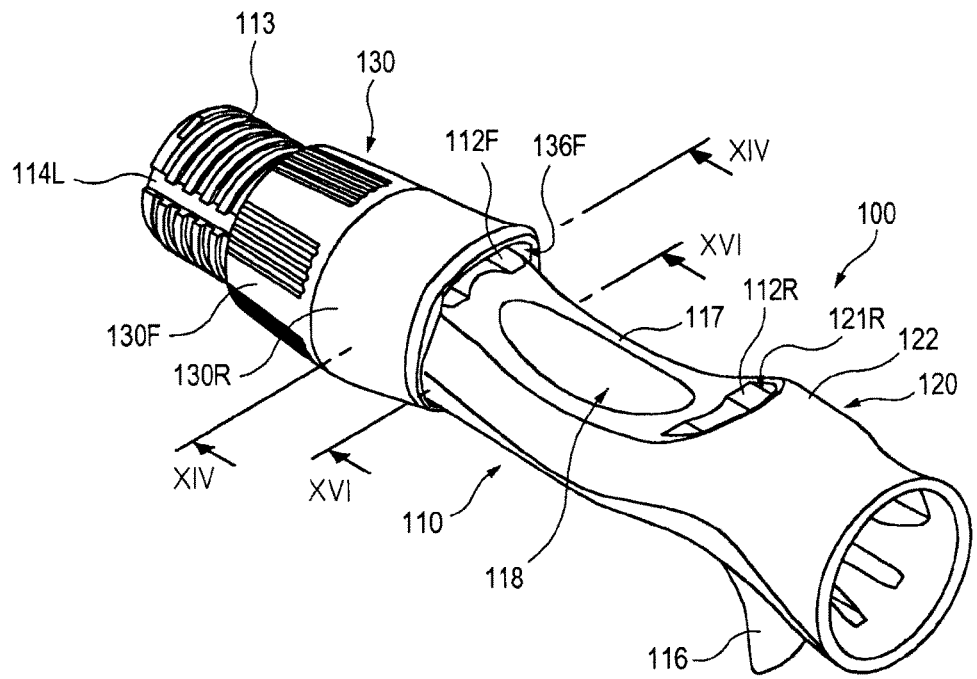
FIG. 4 is a perspective view showing a reel seat according to an embodiment of the present disclosure.
Figure 5:
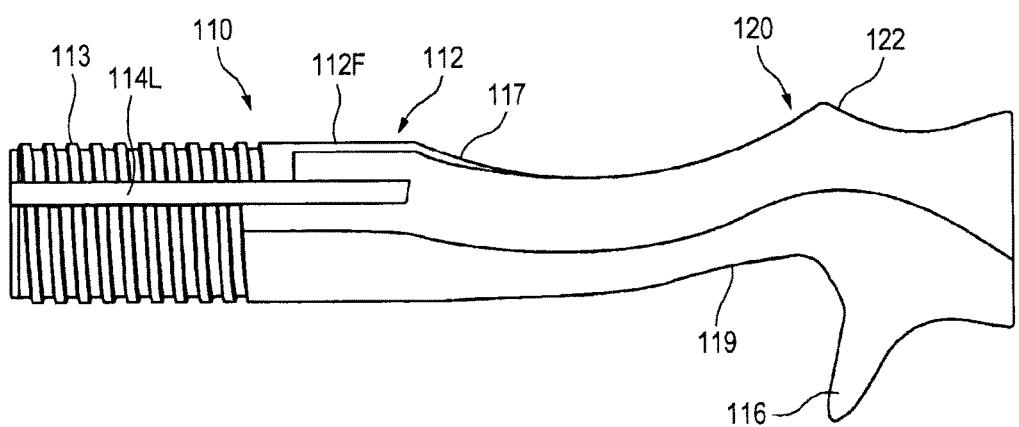
FIG. 5 is a side view of a body of the reel seat shown in FIG. 4.
Figure 6:
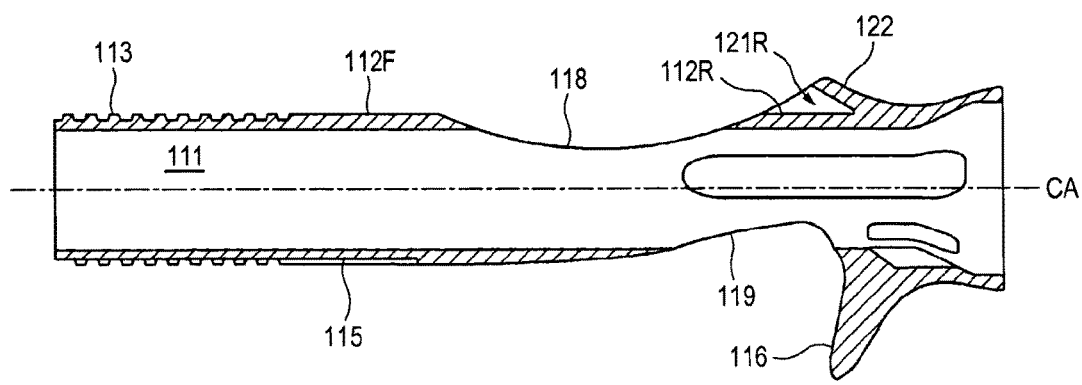
FIG. 6 is a longitudinal sectional view of the body of the reel seat shown in FIG. 4.
Figure 7:
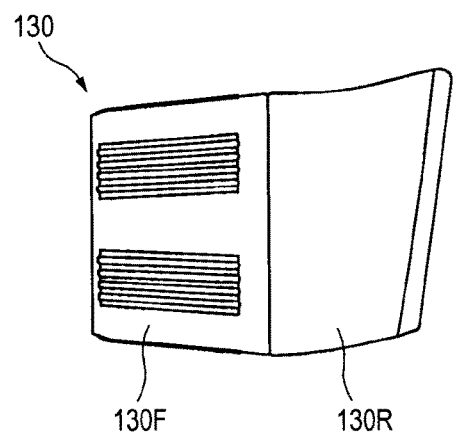
FIG. 7 is a side view of a movable hood shown in FIG. 4.
Figure 8:
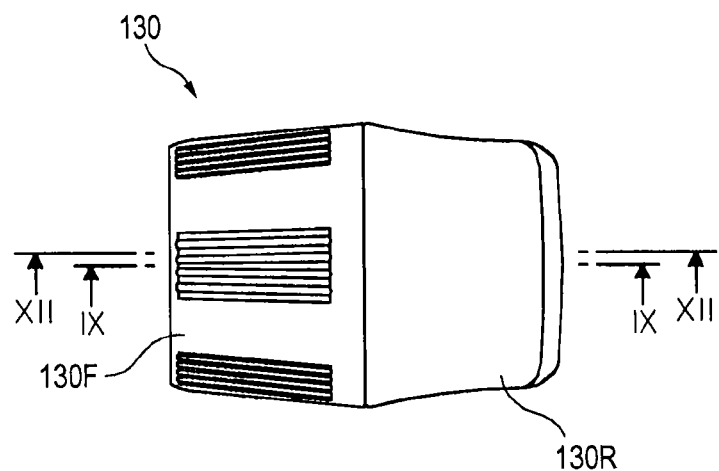
FIG. 8 is a top view of the movable hood shown in FIG. 4.
Figure 9:
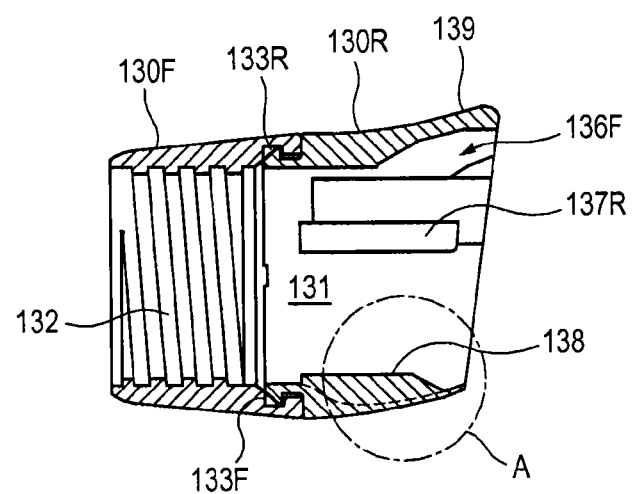
FIG. 9 is a sectional view taken along the line IX-IX of FIG. 8.
Figure 10:
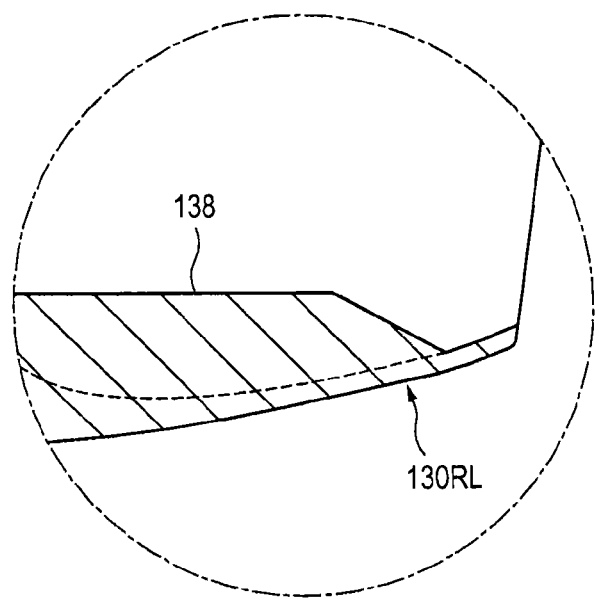
FIG. 10 is an enlarged view of the A portion of FIG. 9.
Figure 11:
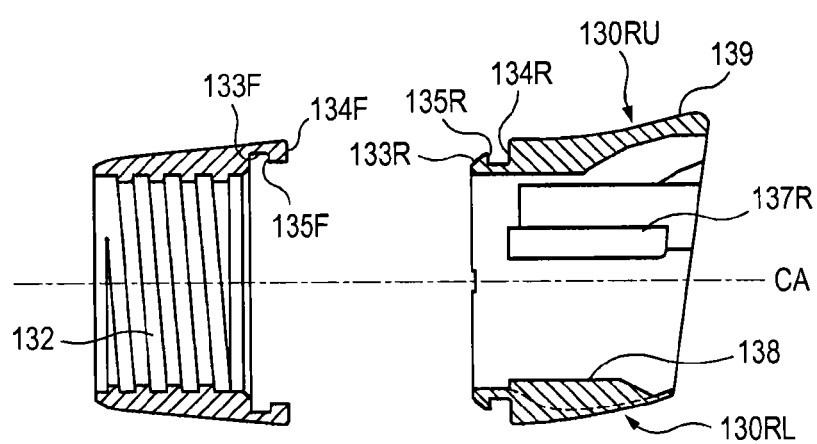
FIG. 11 is a sectional view similar to FIG. 9, showing that a hood portion and a nut portion of the movable hood are separated.
Figure 12:
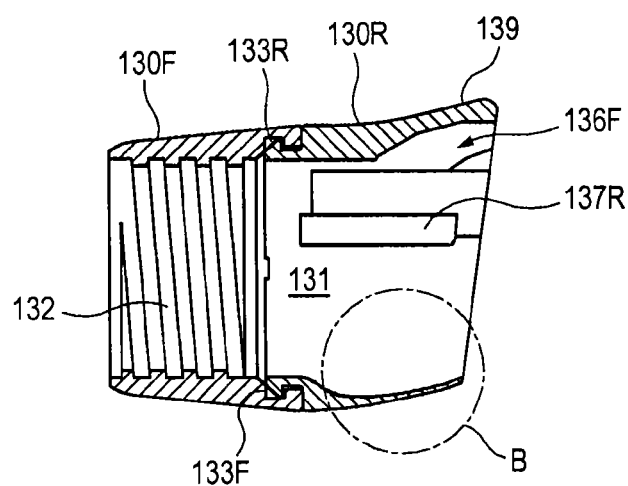
FIG. 12 is a sectional view taken along the line XII-XII of the FIG. 8.

Referring to FIGS. 3 and 4, the reel seat 100 includes a body 110, a fixed hood 120 and a movable hood 130. The movable hood 130 and the fixed hood 120 are located at longitudinally opposing ends of the body 110 respectively. In an embodiment, the movable hood 130 is located at one end portion of the body 110 (a front end portion of the body 110 in a longitudinal direction) and is movable in the longitudinal direction of the body 110. The movable hood 130 clamps one of the pair of attachment legs 310 of the reel 300 (in an embodiment, the front attachment leg 310F) to the body 110. The fixed hood 120 is located at an opposite end portion of the body 110 (a rear end portion of the body 110 in the longitudinal direction) which is located opposite the movable hood 130. The fixed hood 120 clamps the other of the pair of attachment legs 310 of the reel 300 (in an embodiment, the rear attachment leg 310R) to the body 110. In some embodiments, the fixed hood 120 may be located at the front end portion of the body 110, while the movable hood 130 may be located at the rear end portion of the body 110.

The body 110, the fixed hood 120 and the movable hood 130 of the reel seat 100 may be made of a resin material or a metallic material. In this embodiment, the movable hood 130 of the reel seat 100 is made of a resin material.

The body 110 of the reel seat 100 is described with reference to FIGS. 3 to 6 and 14. The body 110 of the reel seat 100 has an approximately cylindrical shape through which a bore 111 extends in a longitudinal direction. A blank 210 of the fishing rod 200 is fitted to the bore 111 of the body 110 and passes through the body 110.

The body 110 has a seat portion for seating the attachment legs 310 of the reel 300 thereon. In this embodiment, said seat portion comprises a pair of flat seat surfaces which are located at an upper side of the body 110 and are spaced apart in the longitudinal direction of the body 110. That is, said seat portion comprises a front seat surface 112F which is located at a front portion of the body 110, and a rear seat surface 112R which is located in a rear portion of the body 110. A lower surface of the front attachment leg 310F is seated on the front seat surface 112F and a lower surface of the rear attachment leg 310R is seated on the rear seat surface 112R.

The body 110 has a male thread 113 at the front end portion. The male thread 113 is formed from the front end of the body 110 approximately to a front end of the front seat surface 112F along an outer peripheral surface of the body 110. The male thread 113 is threadedly coupled to a female thread formed in a nut portion 130F of the movable hood 130, which will be described below.

Further, the body 110 has, in its outer peripheral surface, a pair of first guide grooves 114L and 114R and a second guide groove 115 for guiding a movement of the movable hood 130 in the longitudinal direction of the body 110. The pair of first guide grooves 114L and 114R are opposite to each other above a central axis CA of the body 110. The pair of first guide grooves 114L and 114R extend from the front end of the body 110 across the male thread 113 along the longitudinal direction of the body 110 by a predetermined length. The second guide groove 115 is located at a lower middle end of the body 110. The second guide groove 115 extends from the front end of the body 110 across the male thread 113 along the longitudinal direction of the body 110 by a predetermined length.

Further, the body 110 has a lever 116 which is located opposite the seat portion and projects downward. The lever 116 is integrally formed with the body 110. The lever 116 functions such that a finger of a user is caught on the lever 116 when the user grips the body 110. By way of example, as shown in FIG. 3, the user can grip the reel seat 100 such that the user's pinkie finger is located in front of the lever 116.

Further, the body 110 has an upper recess 117, which is roundly recessed when viewing the reel seat 100 from the side, at the upper side between the front seat surface 112F and the rear seat surface 112R. The upper recess 117 connects with the front seat surface 112F at its front end and connects with the rear seat surface 112R at its rear end. The upper recess 117 is formed concavely toward an inside of the bore 111 and therefore an oval opening 118 communicating with the bore 111 is formed in the upper recess 117. Further, the body 110 has a lower recess 119, which is located in front of the lever 116, at its underside. The lower recess 119 is gradually recessed to the inside of the body 110 toward the rear end of the body 110. As shown in FIG. 3, a ring finger and a pinkie finger are positioned to the lower recess 119 when the user grips the reel seat 100. Thus, the user can grip the reel seat 100 with a stable grip feeling.

The body of the reel seat of some embodiments may include at least one of the lever 116, the upper recess 117 and the lower recess 119, or may not include them.

Further, the reel seat 100 includes a grip portion 140 which is complementarily coupled to the rear end of the body 110. The grip portion 140 has a cylindrical shape which is coaxial with the bore 111 of the body 110. The blank 210 of the fishing rod 200 is coupled to a central bore of the grip portion by press fitting.

The fixed hood 120 is integrated with the body 110 at the rear upper side of the body 110. The fixed hood 120 includes a cover portion 122 which is formed to cover the rear seat surface 112R. An inside of the cover portion 122 is shaped such that a height gradually decreases toward the rear end of the body 110. Thus, a rear insertion cavity 121R, to which the rear attachment leg 310R of the reel 300 is inserted, is defined between the rear seat surface 112R of the body 110 and the fixed hood 120. A cross-sectional shape of the rear insertion cavity 121R is an approximately circular arc and its vertical width gradually decreases toward the rear end of the body 110. Therefore, an inside surface of the cover portion 122 of the fixed hood 120 is in contact with the inclined surface 311R of the rear end portion of the rear attachment leg 310R. In some embodiments, the fixed hood 120 may be manufactured as an individual part and may be attached to the body 110.

The movable hood 130 used for the reel seat 100 is described with reference to FIGS. 3 to 17.

The movable hood 130 is formed in the shape of a ring. The body 110 of the reel seat 100 is fitted to the movable hood 130 and passes through the movable hood 130. The movable hood 130 includes a movable portion, which is linearly movable along the longitudinal direction of the body 110 but does not move in a circumferential direction of the body 110, and a rotating portion, which is connected to said movable portion so as to rotate around the body 110 and pushes or pulls said movable portion with respect to the body 110 along the longitudinal direction of the body 110. Due to a force with which said rotating portion pushes said movable portion in the longitudinal direction of the body 110, said movable portion presses and clamps the front attachment leg 310F of the reel 300 to the body 110. In this embodiment, said movable portion of the movable hood 130 is a hood portion 130R located at a rear portion of the movable hood 130, and said rotating portion of the movable hood 130 is a nut portion 130F located at a front portion of the movable hood 130.

The nut portion 130F and the hood portion 130R are formed in an approximate ring shape and have a bore 131 coaxial with the central axis CA of the body 110 therein. The body 110 of the reel seat 100 passes through the bore 131. The nut portion 130F is threadedly coupled to the body 110 at its inner peripheral surface and is moved frontward or rearward along the body 110 through a screw motion. The hood portion 130R is pushed toward the fixed hood 120 or pulled away from the fixed hood 120 by the frontward or rearward movement of the nut portion 130F. As shown in FIG. 3, when the user grips the fishing rod 200, the user's forefinger or middle finger is in contact with a lower half of the hood portion 130R.

The nut portion 130F has a shape wherein an outer diameter flares toward the rear end, i.e. a shape tapering toward the front. The nut portion 130F has, in its inner peripheral surface, a female thread 132 which is threadedly coupled to the male thread 113 of the body 110. The nut portion 130F has, in the rear inner peripheral surface, an engagement groove 133F for connection to the hood portion 130R. The engagement groove 133F is formed in a circumferential direction of the inner peripheral surface of the nut portion 130F. Further, the hood portion 130R has, at the front end, a hook-shaped engagement protrusion 133R which is engaged with the engagement groove 133F of the nut portion 130F. The engagement protrusion 133R extends at the front end of the hood portion 130R intermittently or continuously in the circumferential direction of the hood portion. In some embodiments, the nut portion 130F may have said engagement protrusion at its rear end, and the hood portion 130R may have said engagement groove at its front end.

The engagement protrusion 133R of the hood portion 130R is engaged with the engagement groove 133F of the nut portion 130F, connecting the nut portion 130F to the hood portion 130R such that the nut portion 130F rotates around the central axis CA of the body 110. When the hood portion 130R and the nut portion 130F connected to each other are in a free state, they are relatively rotatable. The female thread 132 of the nut portion 130F is threadedly coupled to the male thread 113 of the body 110. Thus, if the nut portion 130F is rotated around the body 110, then the nut portion 130F does a screw motion by the interaction between the male thread 113 and the female thread 132 and thus can be moved along the longitudinal direction of the body 110 while being rotated.

By way of example, if the nut portion 130F is rotated in one direction so as to be moved toward the rear end of the body 110 (hereinafter, the rotation direction of the nut in this case is referred to as a "nut-fastening direction"), then, through the male thread 113 of the body 110 and the female thread 132 of the nut portion 130F which are threadedly coupled to each other, the nut portion 130F is moved toward the rear end of the body 110 while being rotated around the body 110. At this time, a ring-shaped rear end surface 134F of the nut portion 130F is in contact with a ring-shaped contact surface 134R which is located in the rear of the engagement protrusion 133R of the hood portion 130R, and thus the nut portion 130F pushes the hood portion 130R toward the rear end of the body 110. Due to the pushing force of the nut portion 130F, the hood portion 130R presses the front attachment leg 310F of the reel 300, which is seated on the front seat surface 112F, against the front seat surface 112F of the body 110 through an upper inner surface of the hood portion 130R. Thus, the hood portion 130R clamps the front attachment leg 310F to the body 110. Further, if the nut portion 130F is rotated in a direction opposite to said one direction so as to be moved toward the front end of the body 110 (hereinafter, the rotation direction of the nut in this case is referred to as a "nut-unfastening direction"), then, through the male thread 113 of the body 110 and the female thread 132 of the nut portion 130F, the nut portion 130F is moved toward the front end of the body 110 while being rotated around the body 110. At this time, a ring-shaped rear end surface 135F of the engagement groove 133F of the nut portion 130F catches a rear surface 135R of the engagement protrusion 133R. Thus, the hood portion 130R is pulled toward the front end of the body 110 along with the movement of the nut portion 130F.

As to the above-described frontward or rearward movement of the hood portion 130R, the hood portion 130R is linearly moved toward the front end or the rear end of the body 110 along the longitudinal direction of the body 110 without being rotated around the central axis CA of the body 110. To guide the linear movement of the hood portion 130R, the movable hood 130 includes a guide element which is formed in the inner peripheral surface of the hood portion 130R and is fitted to the outer peripheral surface of the body 110. Referring to FIGS. 14 to 17, as said guide element, the hood portion 130R includes, in its inner peripheral surface, first guide projections 137L and 137R which are fitted to the pair of first guide grooves 114L and 114R of the body 110 respectively, and a second guide projection 138 which is fitted to the second guide groove 115 of the body 110. The pair of first guide projections 137L and 137R are located opposite each other above the central axis CA of the hood portion 130R and projects from the inner peripheral surface of the hood portion 130R. The second guide projection 138 projects upward from the inner peripheral surface of the hood portion 130R at the lower end of the hood portion 130R.

Figure 13:
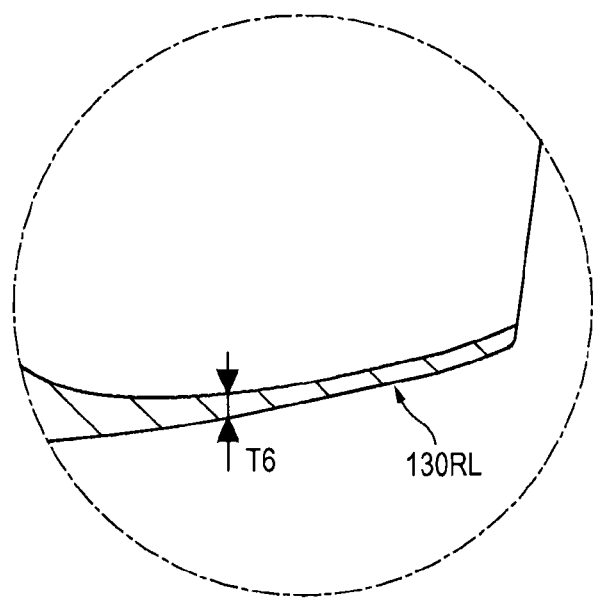
FIG. 13 is an enlarged view of the B portion of FIG. 12.

An upper half 130RU of the hood portion 130R protrudes upward more and more toward the rear end, forming a cover portion 139 covering the front attachment leg 310F. Thus, a front insertion cavity 136F, to which the front attachment leg 310F is inserted, is defined between the cover portion 139 and the front seat surface 112F of the body 110. The hood portion 130R presses the inclined surface 311F of the front end portion of the front attachment leg 310F against the front seat surface 112F through an inside surface of the cover portion 139. Further, as shown in FIG. 13, in the longitudinal section of the hood portion 130R, a vertical thickness T6 of a portion of the lower half 130RL of the hood portion 130R, which is located opposite the cover portion 139, is thinner than a vertical thickness of the cover portion 139 and gradually decreases toward the rear end of the hood portion 130R.

The lower half 130RL of the hood portion 130R, which the users' fingers contact, has a thickness gradually decreasing toward the lower end and the rear end. Thus, a stepped portion is scarcely formed between a lower outer surface of the hood portion 130R and a lower outer surface of the body 110. Further, the hood portion 130R is formed to ensure a strength of the lower half 130RL while scarcely forming such a stepped portion. Descriptions are made as to such feature of the movable hood 130 with reference to FIGS. 14 to 17.

If a portion of the hood portion 130R of the movable hood 130, which is located opposite a portion for clamping the front attachment leg 310F of the reel 300, is made thin, then the stepped portion between the lower outer surface of the hood portion 130R and the lower outer surface of the body 110 can decrease. If the hood portion 130R is pushed against the front attachment leg 310F of the reel 300 by the rotation of the nut portion 130F in the nut-fastening direction, then an upward force is applied to the hood portion 130R due to a reaction force from the front attachment leg 310F of the reel 300. Such an upward force propagates up to the lower end of the hood portion 130R in the circumferential direction of the hood portion 130R. A weld line portion, which is formed by the flow of molten resin joining together during injection molding of the hood portion, exists in the lower half 130RL of the resin-made hood portion 130R. If the lower half 130RL of the hood portion 130R has a thin thickness, then the lower half 130RL may have low strength. Therefore, if the aforementioned upward force is applied to the hood portion 130R, it is probable that the hood portion 130R splits at the lower half 130RL. However, the hood portion 130R of the movable hood 130 according to an embodiment is configured such that the thickness of the lower half 130RL becomes thin for the purposes of eliminating the stepped portion and the strength is reinforced by distributing the upward force applied to the hood portion 130R. Further, the weld line portion is formed in the second guide projection 138 which is thicker than a vertical thickness T4 at a lowermost end of the hood portion 130R, thus preventing splitting of the hood portion.

Figure 14:
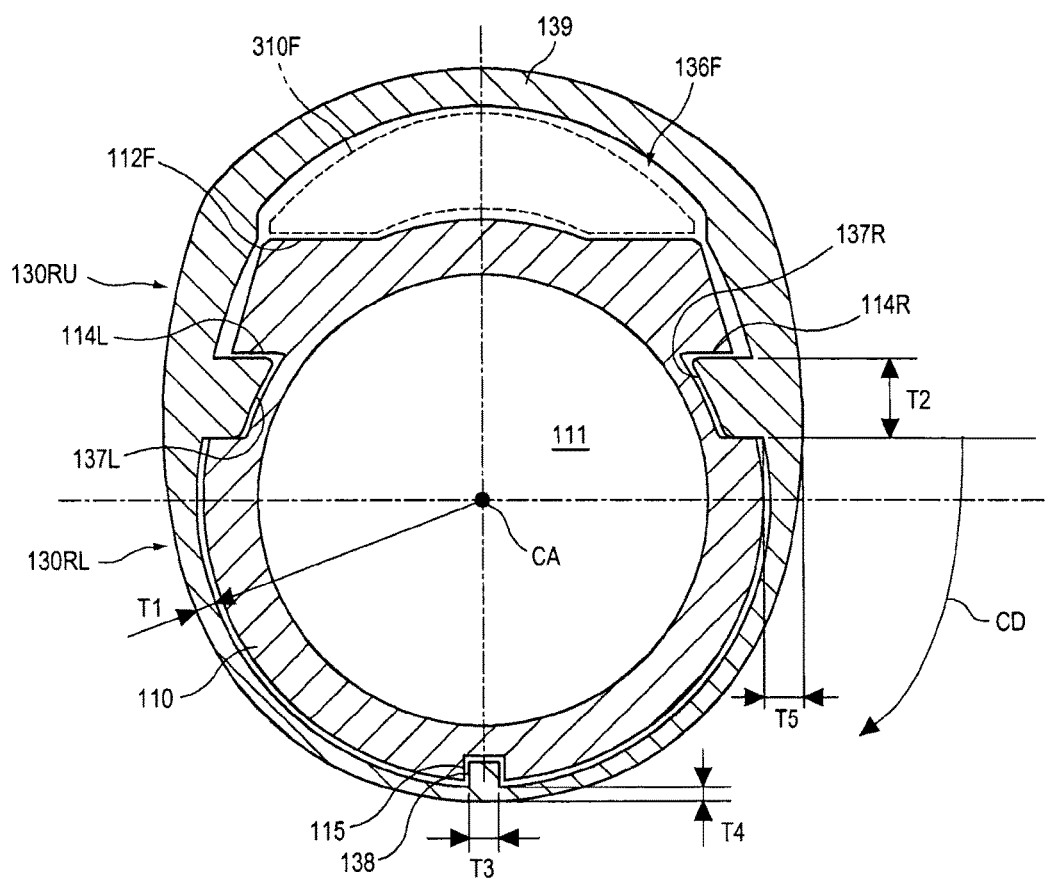
FIG. 14 is a sectional view taken along the line XIV-XIV of FIG. 4.

Reference is made to a cross-sectional view of the front portion of the reel seat 100 shown in FIG. 14. FIG. 14 shows any cross-section of a portion of the hood portion 130R in the longitudinal direction thereof (the same direction as the longitudinal direction of the body 110). Said portion of the hood portion in the longitudinal direction exits between the front end and the rear end of the hood portion 130R. When said portion in the longitudinal direction is viewed through cross-section, said portion takes the shape of a ring. As described above, the movable hood 130 has the first guide projections 137L and 137R and the second guide projection 138, which have a convex shape, in the inner peripheral surface of the hood portion 130R. The first guide projections 137L and 137R are located opposite each other in the inner peripheral surface of the hood portion 130R above the central axis CA, and the second guide projection 138 is located in the inner peripheral surface of the hood portion 130R at the lower end of the hood portion 130R. The first guide projections 137L and 137R and the second guide projection 138 are fitted to the first guide grooves 114L and 114R and the second guide groove 115 respectively with certain clearance. Thus, if the hood portion 130R is pushed up while pressing the front attachment leg 310F of the reel 300, then the first guide projections 137L and 137R are brought into contact with upper surfaces of the first guide grooves 114L and 114R respectively and the second guide projection 138 is brought into contact with an upper surface of the second guide groove 115.

A vertical thickness T2 of the first guide projections 137L and 137R (i.e., in the cross-section of said portion of the hood portion 130R in the longitudinal direction shown in FIG. 14, the thickness of the first guide projections 137L and 137R in a vertical direction) is greater than a horizontal thickness T3 of the second guide projection 138 (i.e., in the cross-section of said portion of the hood portion 130R in the longitudinal direction shown in FIG. 14, the thickness of the second guide projection 138 in a horizontal direction). Further, the horizontal thickness T3 of the second guide projection 138 is greater than a vertical thickness T4 of the lower half 130RL at the lowermost end, at which the second guide projection 138 is located (i.e., in the cross-section of said portion of the hood portion 130R in the longitudinal direction shown in FIG. 14, the thickness of the hood portion 130R in the vertical direction at the lowermost end at which the second guide projection 138 is located). That is, the vertical thickness T4 of the hood portion 130R at the lowermost end at which the second guide projection 138 is located is less than the horizontal thickness T3 of the second guide projection 138, and the horizontal thickness T3 of the second guide projection 138 is less than the vertical thickness T2 of the first guide projections 137L and 137R. Further, in the cross-section of said portion of the hood portion 130R in the longitudinal direction, a radial thickness T1 of said portion of the hood portion 130R in the longitudinal direction with respect to the central axis CA of the lower half 130RL gradually decreases from the lower end of the first guide projections 137L and 137R toward the lowermost end of the hood portion 130R (the second guide projection 138). Specifically, the radial thickness T1 of the lower half 130RL of the hood portion 130R gradually decreases from the lower end of the first guide projections 137L and 137R along the circumferential direction of the hood portion 130R (see an arrow CD in FIG. 14) toward the second guide projection 138. Further, in the cross-section of said portion in the longitudinal direction, the vertical thickness T4 of the hood portion 130R at the lowermost end at which the second guide projection 138 is located is less than a horizontal thickness T5 of the hood portion 130R at the lower end of the first guide projection 137L, 137R. In one embodiment, in the cross-section of said portion in the longitudinal direction shown in FIG. 14, the vertical thickness T4 of the hood portion 130R at the lowermost end is 35% to 80% of the horizontal thickness T5 of the hood portion 130R at the lower end of the first guide projection 137L, 137R. Where the vertical thickness T4 of the hood portion 130R at the lowermost end is less than 35% of the horizontal thickness T5 of the hood portion 130R at the lower end of the first guide projection 137L, 137R, the strength of the lower half 130RL of the hood portion becomes insufficient and the lower half 130RL tends to be damaged.

The aforementioned thicknesses T1 to T5 in the respective portions of the hood portion 130R are described with reference to any cross-section of said portion of the hood portion 130R in the longitudinal direction shown in FIG. 14. The portion of the hood portion 130R, which has the aforementioned thicknesses T1 to T5, may be at least a portion or almost the whole of the hood portion 130R throughout the overall length of the hood portion 130R between the front end and the rear end of the hood portion 130R.

Figure 15:
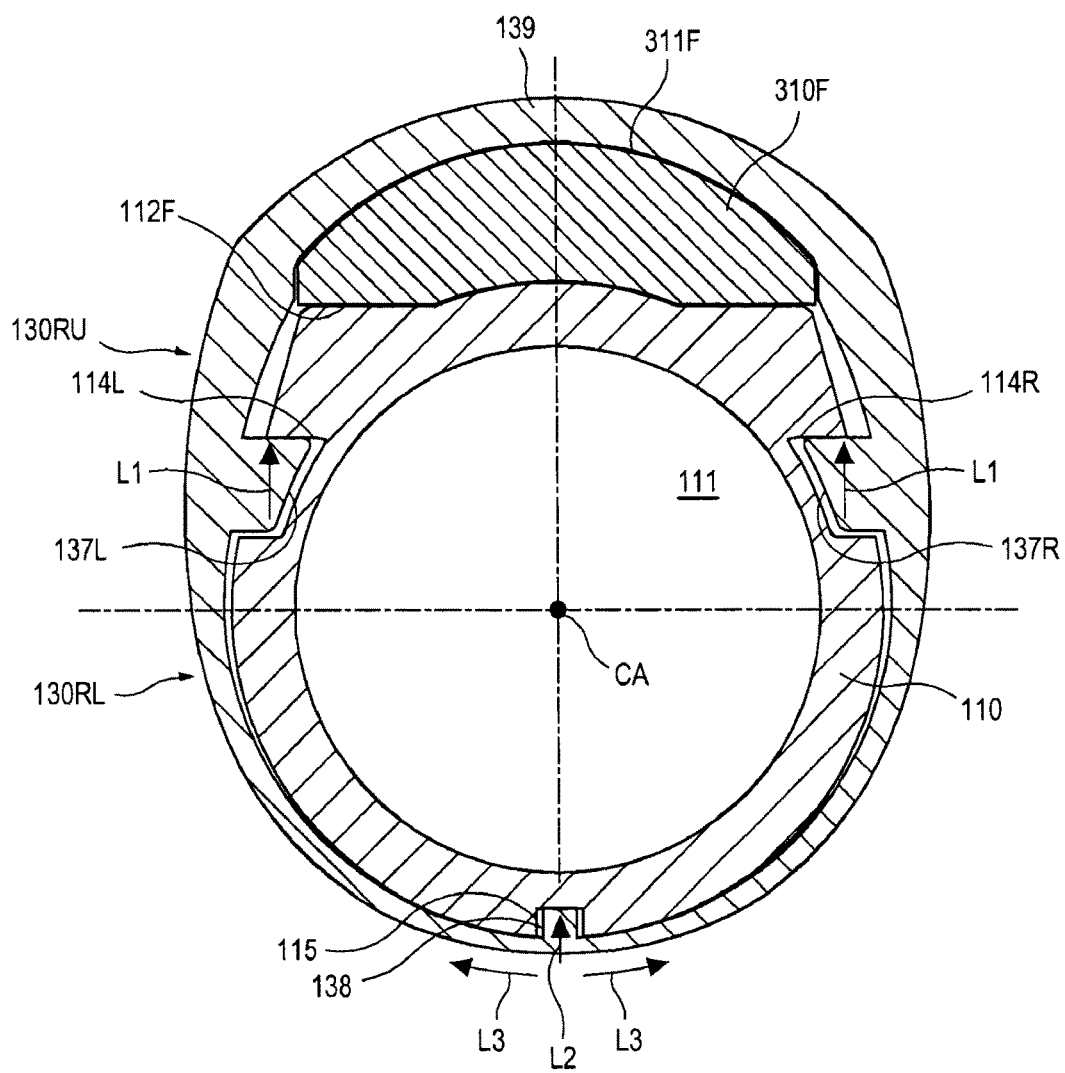
FIG. 15 is a sectional view similar to FIG. 14, illustrating that an upward force applied to the hood portion of the movable hood is distributed.
Figure 16:
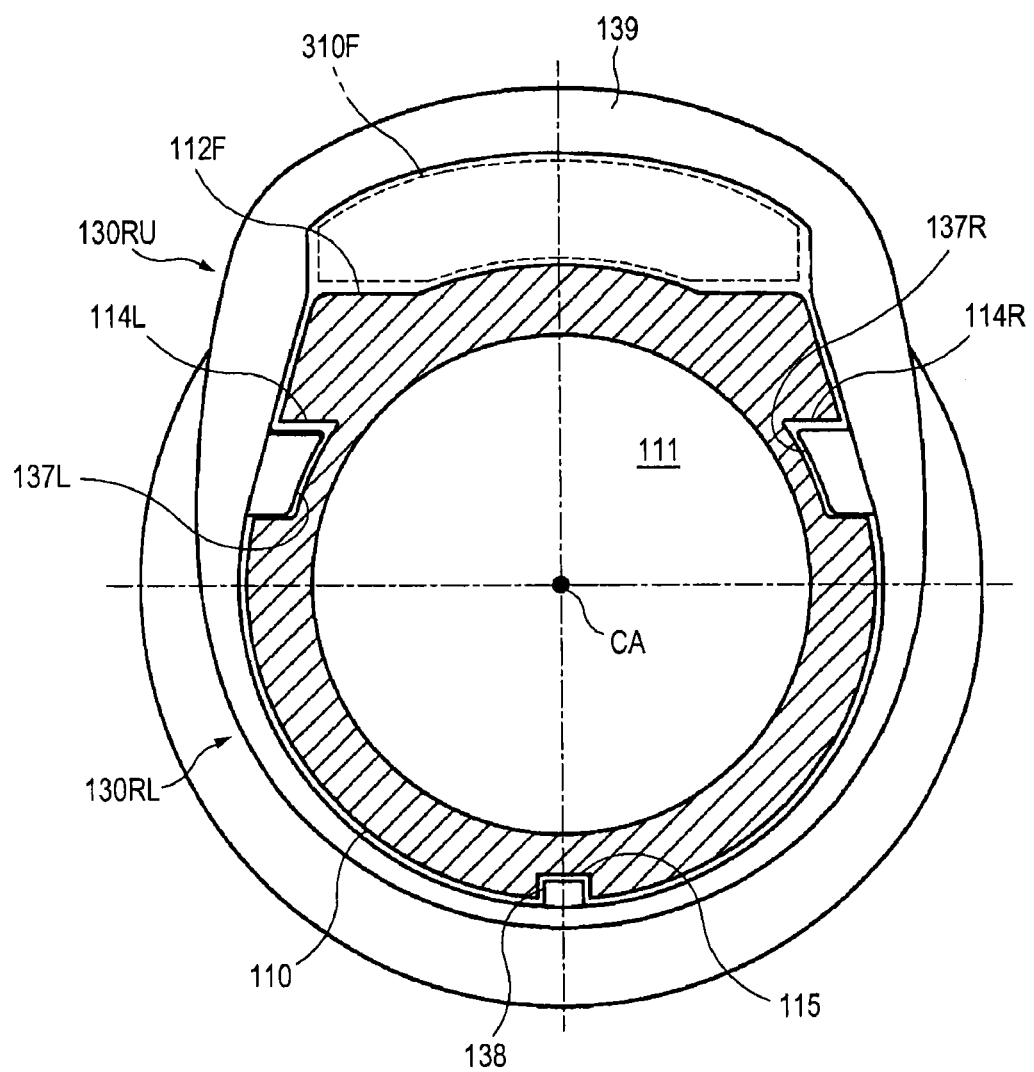
FIG. 16 is a sectional view taken along the line XVI-XVI of FIG. 4.

With reference to FIGS. 14 to 17, descriptions are made as to an example where the upward force applied to the hood portion 130R is distributed when the hood portion 130R clamps the front attachment leg 310F. FIG. 16 is a cross-sectional view taken at the rear end of the hood portion 130R.

When the reel 300 is attached to the reel seat 100, first, the rear attachment leg 310R of the reel 300 is fitted to the rear insertion cavity 121R and the lower surface of the rear attachment leg 310R is seated on the rear seat surface 112R. Concurrently with or after seating the rear attachment leg 310R, the front attachment leg 310F of the reel 300 is seated on the front seat surface 112F.

As the nut portion 130F of the movable hood 130 is rotated with respect to the body 110 in the nut-fastening direction in the state where the front attachment leg 310F of the 300 is seated on the front seat surface 112F, the nut portion 130F performs a screw motion toward the rear end of the body 110 through the interaction between the male thread 113 of the body 110 and the female thread 132 of the nut portion 130F and, at the same time, pushes the hood portion 130R toward the rear end of the body 110. Then, the inside surface of the cover portion 139 of the hood portion 130R is brought into contact with the inclined surface 311F of the front end portion of the front attachment leg 310F. Since the inclined surface 311F of the front attachment leg 310F is inclined toward the front end, the front end portion of the front attachment leg 310F functions as a wedge. Thus, the hood portion 130R is pushed up along the inclined surface 311F due to the pushing force of the nut portion 130F. As the hood portion 130R is pushed up, the upper surface of the first guide projections 137L, 137R is brought into contact with the upper surface of the first guide grooves 114L, 114R. As the nut portion 130F is continued to be rotated in the nut-fastening direction, the pushing force applied by the nut portion 130F is applied to the inclined surface 311F through the cover portion 139 and the front end portion of the front attachment leg 310F, which functions as a wedge, applies the upward force to the hood portion 130R through the cover portion 139 of the hood portion 130R as a reaction. The upward force applied to the hood portion 130R acts along the circumferential direction of the hood portion 130R. Therefore, a load is applied to the first guide projections 137L and 137R which are in close contact with the upper surfaces of the first guide grooves 114L and 114R.

As the nut portion 130F is further rotated in the nut-fastening direction in a state where the load is applied to the first guide projections 137L and 137R, the hood portion 130R is further pushed up and the upward force applied to the hood portion 130R becomes stronger. Then, as the hood portion 130R bends, the second guide projection 138 located at the lower end of the hood portion 130R is brought into close contact with the second guide groove 115 and the load is applied to the second guide projection 138.

As such, the upward force, which is applied to the hood portion 130R by the front attachment leg 310F while the nut portion 130F pushes the hood portion 130R against the front attachment leg 310F, applies the load to the first guide projections 137L and 137R and the second guide projection 138, since the first guide projections 137L and 137R are brought into close contact with the first guide grooves 114L and 114R and the second guide projection 138 is brought into close contact with the second guide groove 115. Therefore, the upward force applied to the hood portion 130R is distributed through the load application to three locations (the first guide projection 137L located left, the first guide projection 137R located right, the second guide projection 138 located below).

As the nut portion 130F is furthermore rotated in the nut-fastening direction in the state where the load is applied to the first guide projections 137L and 137R and the second guide projection 138, the upward force applied to the hood portion 130R becomes stronger, thus bending a thickness-decreasing portion of the lower half 130RL of the hood portion 130R (i.e., in the cross-section of said portion of the hood portion 130R in the longitudinal direction thereof, a portion having a thickness gradually decreasing from the first guide projection 137L, 137R toward the second guide projection 138). Further, as a result of the aforementioned bending of the hood portion, a portion or the whole of the lower half 130RL comes into contact with the outer peripheral surface of the body 110. Then, the upward force, which is distributed through the load application at three locations, is more distributed through the lower half 130RL and the body 110. In addition, a gap between the lower half 130RL and the body 110 diminishes, thereby further reducing the stepped portion between the outer surface of the lower half 130RL and the outer surface of the body 110. Accordingly, once the movable hood 130 clamps the front attachment leg 310F of the reel 300 to the body 110, the stepped portion does not exist between the outer surface of the lower half 130RL and the outer surface of the body 110, and therefore the reel seat 100 can give the user a superior grip feeling. Further, once the movable hood 130 clamps the front attachment leg 310F of the reel 300 to the body 110, the lower half 130RL of the hood portion 130R bends as described above, and, due to the elasticity of the hood portion 130R generated in concomitant with such bending, the hood portion 130R of the movable hood 130 is capable of clamping the front attachment leg 310F to the front seat surface 112F of the body 110 without looseness or rattling.

In the above-described example, due to the upward force applied to the hood portion 130R, the first guide projections 137L and 137R are first subject to the load (see arrow L1 in FIG. 15), and next the second guide projection 138 is subject to the load (see arrow L2 in FIG. 15), and thereafter the lower half 130RL of the hood portion 130R is subject to the load (see arrow L3 in FIG. 15). Further, the intensity of the load is strongest at the first guide projections 137L and 137R, weaker at the second guide projection 138 than the first guide projections 137L and 137R, and weaker at the thickness-decreasing portion of the lower half 130RL of the hood portion 130R than the second guide projection 138.

As described above, in the cross-section of said portion of the hood portion 130R in the longitudinal direction, the radial thickness T1 of the lower half 130RL of the hood portion 130R gradually decreases toward the lowermost end of the hood portion 130R and the vertical thickness of the hood portion 130R at the lowermost end is smallest. Further, in the longitudinal section of the hood portion 130R, the vertical thickness T6 of the lower half 130RL of the hood portion 130R gradually decreases toward the rear end of the hood portion 130R. However, along with being fastened of the nut portion 130F, the hood portion 130R distributes the upward force applied from the front attachment leg 310F through the load application at three locations (the first guide projections 137L and 137R and the second guide projection 138). Thus, the thinnest portion and the weld line portion of the lowermost end of the hood portion 130R can be reinforced. As such, the hood portion 130R of the movable hood 130 can have enhanced strength as well as the thickness gradually decreasing toward the lower end and the rear end. Further, the hood portion 130R of the movable hood 130 can achieve weight reduction due to its thin shape and achieve the reduction of the stepped portion between the hood portion and the body 110. Further, as the nut portion 130F is further rotated in the nut-fastening direction under the load application at three locations of the hood portion 130R, the lower half 130RL of the hood portion 130R further bends, and the lower half 130RL partially or wholly comes into contact with the body 110 of the reel seat 100 accordingly. Therefore, the hood portion 130R further reduces the gap and the stepped portion between the hood portion and the body 110 while further distributing the upward force, thus achieving the reel seat 100 having a superior grip feeling. Further, due to the aforementioned elasticity which is concomitant with being bent of the lower half 130RL of the hood portion 130R, the hood portion 130R is capable of clamping the front attachment leg 310F of the reel 300 to the body 110 without looseness and rattling.

The present disclosure described heretofore should not be limited to the above-described embodiments and the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS 100 reel seat, 110 body of reel seat, 112F front seat surface, 112R rear seat surface, 113 male thread, 114L, 114R first guide groove, 115 second guide groove, 116 lever, 117 upper recess, 119 lower recess, 120 fixed hood, 121R rear insertion cavity, 122 cover portion, 130 movable hood, 130F nut portion, 130R hood portion, 130RU upper half of hood portion, 130RL lower half of hood portion, 132 female thread, 133F engagement groove, 133R engagement protrusion, 136F front insertion cavity, 137L, 137R first guide projection, 138 second guide projection, 139 cover portion, 200 fishing rod, 210 blank of fishing rod, 300 reel, 310 attachment leg of reel, 310F front attachment leg, 310R rear attachment leg, 311F inclined surface of front attachment leg, 311R inclined surface of rear attachment leg

What is claimed is:

1. A movable hood for a reel seat, comprising:
a hood portion through which a body of a reel seat passes, and which presses and clamps an attachment leg of a reel to the body, the hood portion including a pair of first guide projections and a second guide projection which are fitted to an outer peripheral surface of the body to guide a movement in a longitudinal direction of the body; and
a nut portion connected to the hood portion so as to rotate around the body, the nut portion being threadedly coupled to the outer peripheral surface of the body at an inner peripheral surface,
wherein the pair of first guide projections project from an inner peripheral surface of the hood portion above a central axis of the hood portion and the second guide projection projects from the inner peripheral surface of the hood portion at a lowermost end of the hood portion,
wherein in a cross section of the hood portion, a radial thickness (T1) of the hood portion gradually decreases from the first guide projections toward the second guide projection,
wherein in the cross section of the hood portion, a vertical thickness (T4) of the hood portion at the lowermost end of the hood portion is less than a horizontal thickness (T5) of the hood portion at lower ends of the first guide projections,
wherein in the cross section of the hood portion, a vertical thickness of the second guide projection is greater than the vertical thickness (T4) of the hood portion at the lowermost end of the hood portion, and
wherein the movable hood is made of a resin material.

2. The movable hood for a reel seat of claim 1, wherein in the cross section of the hood portion, a vertical thickness (T2) of the first guide projections is greater than a horizontal thickness (T3) of the second guide projection, and the horizontal thickness (T3) of the second guide projection is greater than the vertical thickness (T4) of the hood portion at the lowermost end of the hood portion.

3. The movable hood for a reel seat of claim 2, wherein in the cross section of the hood portion, the vertical thickness (T4) of the hood portion at the lowermost end of the hood portion is 35% to 80% of the horizontal thickness (T5) of the hood portion at the lower ends of the first guide projections.

4. The movable hood for a reel seat of claim 1, wherein in a longitudinal section of the hood portion, a vertical thickness (T6) of a lower half of the hood portion gradually decreases toward a rear end of the hood portion.

5. A reel seat, comprising:
a body including a seat portion, on which a pair of attachment legs of a reel is seated, at an upper side, and a male thread in an outer peripheral surface of one end portion, the body including a bore through which a portion of a fishing rod passes in a longitudinal direction;
a movable hood located at the one end portion of the body and clamping one of the pair of attachment legs to the seat portion of the body; and
a fixed hood located at an opposite end portion of the body and clamping the other of the pair of the attachment legs to the seat portion of the body,
wherein the movable hood comprises:
a hood portion through which the body passes, and which presses and clamps the one of the pair of attachment legs to the seat portion, the hood portion including a pair of first guide projections and a second guide projection which are fitted to the outer peripheral surface of the body to guide a movement in the longitudinal direction; and
a nut portion connected to the hood portion so as to rotate around the body, the nut portion being threadedly coupled to the male thread of the body at an inner peripheral surface,
wherein the pair of first guide projections project from an inner peripheral surface of the hood portion above a central axis of the hood portion and the second guide projection projects from the inner peripheral surface of the hood portion at a lowermost end of the hood portion,
wherein in a cross section of the hood portion, a radial thickness (T1) of the hood portion gradually decreases from the first guide projections toward the second guide projection,
wherein in the cross section of the hood portion, a vertical thickness (T4) of the hood portion at the lowermost end of the hood portion is less than a horizontal thickness (T5) of the hood portion at lower ends of the first guide projections,
wherein in the cross section of the hood portion, a vertical thickness of the second guide projection is greater than the vertical thickness (T4) of the hood portion at the lowermost end of the hood portion, and
wherein the movable hood is made of a resin material.

6. A fishing rod including the movable hood for a reel seat of claim 1.

7. The fishing rod including the reel seat of claim 5.

* * * * *